US012460521B2

(12) United States Patent
Younger et al.

(10) Patent No.: US 12,460,521 B2
(45) Date of Patent: Nov. 4, 2025

(54) METHODS AND SYSTEMS FOR DIFFERENTIATING DIFFERENT TYPES OF FLUIDS IN A FLUID STREAM

(71) Applicant: SAUDI ARABIAN OIL COMPANY, Dhahran (SA)

(72) Inventors: Rae Andrew Younger, Aberdeenshire (GB); Ahmed Yasin Bukhamseen, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/217,101

(22) Filed: Jun. 30, 2023

(65) Prior Publication Data

US 2025/0003318 A1 Jan. 2, 2025

(51) Int. Cl.

| | |
|---|---|
| ***E21B 43/12*** | (2006.01) |
| ***B01D 17/02*** | (2006.01) |
| ***E21B 34/06*** | (2006.01) |
| ***E21B 43/08*** | (2006.01) |

(52) U.S. Cl.

CPC .............. *E21B 43/12* (2013.01); *B01D 17/02* (2013.01); *E21B 34/06* (2013.01); *E21B 43/08* (2013.01)

(58) Field of Classification Search

CPC ...... E21B 33/1212; E21B 34/08; E21B 34/10; E21B 34/06

See application file for complete search history.

(56) References Cited

U.S. PATENT DOCUMENTS

| | | | |
|---|---|---|---|
| 9,234,404 | B2 | 1/2016 | Felten |
| 9,382,779 | B2 | 7/2016 | Dykstra et al. |
| 9,453,395 | B2 | 9/2016 | Fripp et al. |
| 9,506,320 | B2 | 11/2016 | Dykstra et al. |
| 10,711,569 | B2 | 7/2020 | Rong et al. |

(Continued)

FOREIGN PATENT DOCUMENTS

| | | | | |
|---|---|---|---|---|
| AU | 2017216580 B2 | 9/2018 | | |
| CA | 2964430 C * | 9/2022 | ............. | E21B 34/08 |

(Continued)

OTHER PUBLICATIONS

English translation of BR 112015029456. (Year: 2021).*

(Continued)

*Primary Examiner* — Zakiya W Bates

(74) *Attorney, Agent, or Firm* — Osha Bergman Watanabe & Burton LLP

(57) ABSTRACT

An autonomous inflow control device includes a body defining a cavity. An inlet is in fluid communication with the cavity. The inlet receives well fluids. A deflection surface within the cavity deflects the well fluids at an angle based on a predetermined fluid property range of the well fluids. An influx outlet is in fluid communication with the cavity. An actuation device is disposed in the cavity and based on the angle the well fluids deflect off the deflection surface, the actuation device moves between an open position and a closed position. In the closed position, the actuation device covers the influx outlet. In the open position, the actuation device exposes the influx outlet to direct a volume of water from the well fluids out of the cavity. An outlet is in fluid communication with the cavity to direct the well fluids out of the cavity.

11 Claims, 10 Drawing Sheets

(56) References Cited

U.S. PATENT DOCUMENTS

| | | | |
|---|---|---|---|
| 11,319,774 | B2 | 5/2022 | Mathiesen et al. |
| 2015/0060084 | A1 | 3/2015 | Moen et al. |

FOREIGN PATENT DOCUMENTS

| | | | |
|---|---|---|---|
| CN | 107939350 | B | 3/2020 |
| EP | 2531692 | B1 | 12/2015 |
| EP | 2383430 | B1 | 7/2017 |
| EP | 2675994 | B1 | 4/2018 |
| WO | 2022106156 | A1 | 5/2022 |

OTHER PUBLICATIONS

"EquiFlow Autonomous Inflow Control Devices (AICDs)", Halliburton; Well Completions, Sand Control, 2021; pp. 1-2 (2 pages).
International Search Report issued for corresponding international patent application No. PCT/US2024/034983, mailed Sep. 17, 2024 (7 pages).
Written Opinion issued for corresponding international patent application No. PCT/US2024/034983, mailed Sep. 17, 2024 (7 pages).

* cited by examiner

METHODS AND SYSTEMS FOR DIFFERENTIATING DIFFERENT TYPES OF FLUIDS IN A FLUID STREAM

BACKGROUND

In the oil and gas industry, operations may be performed in a well at various depths below the surface with downhole tools. For example, Fluids are typically produced from a reservoir in a formation by drilling a wellbore into the formation, establishing a flow path between the reservoir and the wellbore, and conveying the fluids from the reservoir to the surface through the wellbore. Typically, a production tubing is disposed in the wellbore to carry the fluids to the surface. The produced fluids may include hydrocarbons (e.g., oil and/or gas) and water. As the produced fluids may contain water, a ratio of hydrocarbons (e.g., oil and/or gas) to water may vary throughout the lifetime of the well. Therefore, it is advantageous to restrict or otherwise limit an influx of fluid flow into the wellbore when the water fraction is high and resume a higher or unrestricted flow when the water fraction reduces. As such, various conventional methods may be used to detect fluid types in the fluids produced from the reservoir.

In some embodiments, one or more density devices in the production tubing may be used to detect the fluid types. For example, a float of the one or more density devices may change in position based on the density of the fluids. However, the float has many drawbacks. For example, a position of position of the float changes with tool inclination and/or with respect to gravity, and thus, it may be necessary to orientate the one or more density devices on deployment or to modify and tailor the design to each application. Additionally, the sensitivity to differentiate fluids becomes difficult when hydrocarbon and water densities are almost identical. Further, resulting buoyancy forces on the float may be small, particularly when hydrocarbon and water densities are almost identical (therefore, generating low forces to operate linkages). Furthermore, the detection response may be sudden and binary such that the float either floats or sinks. In some embodiments, instead of the float, the one or more density devices includes a flapper that may change in position based on a viscosity of the fluids. However, the flapper has increasingly difficult differentiating fluids as the fluid properties become similar.

Other conventional methods may include centrifugally rotating a float chamber of the one or more density devices to introduce a radial acceleration vector that is larger than the gravity vector on the float. Additionally, a rotation mechanism is required to operate this centrifugal design, which must continuously run. However, the rotation mechanism provides many disadvantages such as long-term durability and wear, debris intolerance and sensitivity to grit, and increased complexity and cost.

Additionally, a choke valve may be used control flow rates and pressure drops of the produced fluids. A choke size of the choke valve is changeable to allow for the operator to adjust the amount of pressure dropped across the choke valve to maintain a downstream pressure in the production flow line at the desirable value which will lead to achieving the desirable rate. However, an influx of water in the produced fluids may still be considerable. Further, accurately sizing an orifice to the choke valve discriminately becomes increasingly difficult as fluid properties become similar.

SUMMARY OF DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for fluid production in a wellbore having an autonomous inflow control device in a tubular string therein. The method may include directing well fluids, containing water and hydrocarbons, as a fluid stream into the autonomous inflow control device; deflecting the fluid stream off a deflection surface in a cavity of the autonomous inflow control device based on a predetermined fluid property range; closing or opening, with the deflected fluid stream, an actuation device in the cavity to cover or expose an influx outlet in fluid communication with the cavity; and exiting the fluid stream out of the cavity via an outlet in fluid communication with the tubular string.

In another aspect, embodiments disclosed herein relate to an autonomous inflow control device that may include a body defining a cavity; an inlet in fluid communication with the cavity, the inlet receives well fluids; a deflection surface within the cavity, the well fluids deflect off the deflection surface at an angle based on a predetermined fluid property range of the well fluids; an influx outlet in fluid communication with the cavity; an actuation device disposed in the cavity, based on the angle the well fluids deflect off the deflection surface, the actuation device moves between an open position and a closed position, when the actuation device is in the closed position, the actuation device covers the influx outlet, when the actuation device is in the open position, the actuation device exposes the influx outlet to direct a volume of water from the well fluids out of the cavity; and an outlet in fluid communication with the cavity, the outlet directs the well fluids out of the cavity.

In yet another aspect, embodiments disclosed herein relate to a system that may include a tubing string disposed within a wellbore to be in fluid communication with a reservoir; one or more autonomous inflow control tools providing the tubing string to receive well fluids produced from the reservoir, the one or more autonomous inflow control tools comprises a chamber in fluid communion with the tubing string; an autonomous inflow control device disposed in the chamber of the one or more autonomous inflow control tools, the autonomous inflow control device is configured to regulate a flow of the well fluids entering the tubing string based on a ratio of hydrocarbons to water. The autonomous inflow control device may include a body defining a cavity; an inlet in fluid communication with the cavity to receive the well fluid from the chamber; a deflection surface within the cavity, the well fluids deflect off the deflection surface at an angle based on the ratio of hydrocarbons to water; an actuation device disposed in the cavity, based on the angle the well fluids deflect off the deflection surface, the actuation device moves between an open position and a closed position, when the actuation device is in the open position, the actuation device exposes the influx outlet to direct a volume of water from the well fluids out of the cavity and back into the chamber, and when the actuation device is in the closed position, the actuation device covers the influx outlet; and an outlet in fluid communication with the cavity, the outlet directs the well fluids into a bore of the one or more autonomous inflow control tools.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, shapes of the elements as drawn are not necessarily intended to convey any information regarding the actual shape of the elements and have been solely selected for ease of recognition in the drawing.

DETAILED DESCRIPTION

Figure 1:
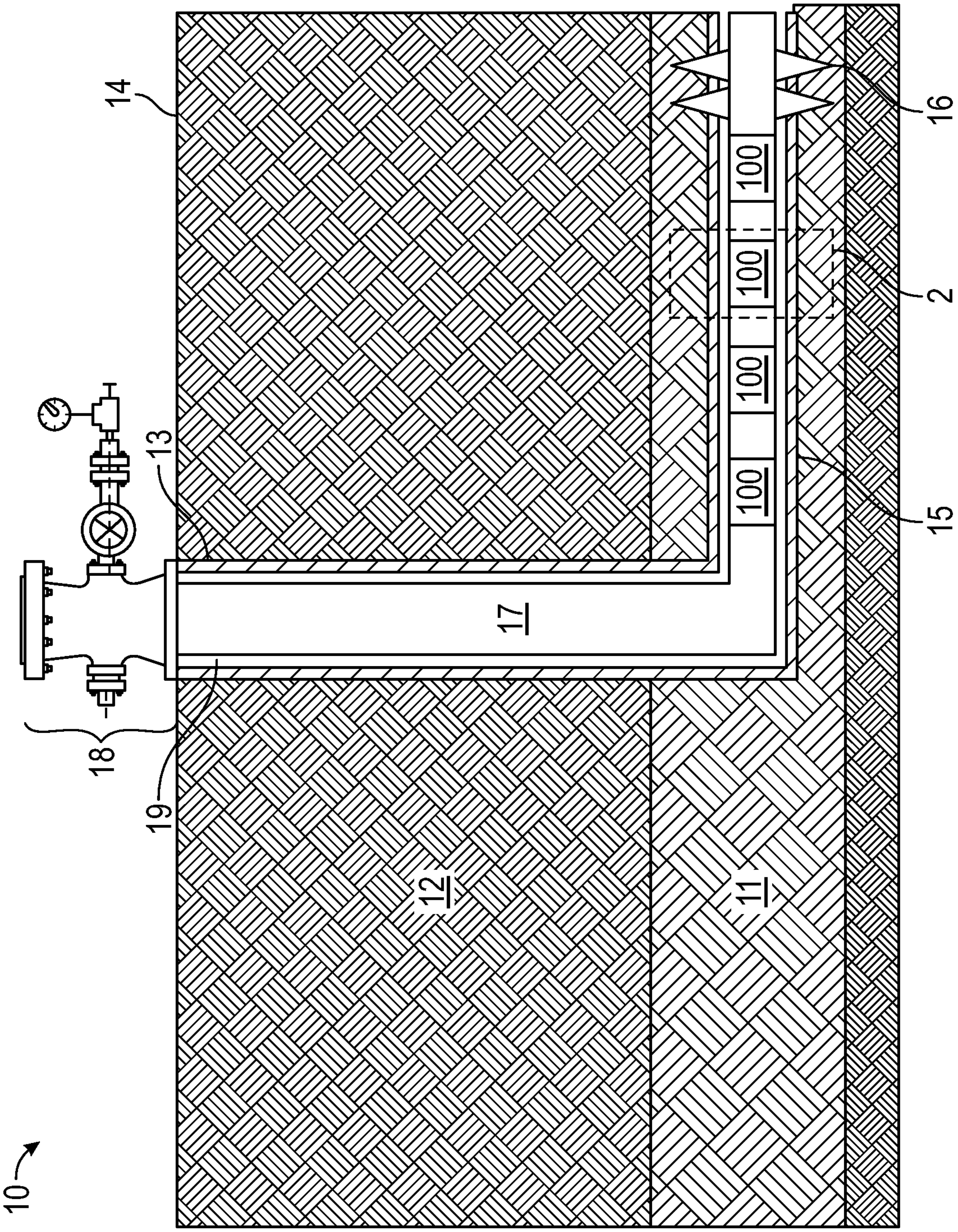
FIG. 1 illustrates a schematic diagram of a completion well system according to one or more embodiments of the present disclosure.

Embodiments of the present disclosure are described below in detail with reference to the accompanying figures. However, one skilled in the relevant art will recognize that implementations and embodiments may be practiced without one or more of these specific details, or with other methods, components, materials, and so forth. For the sake of continuity, and in the interest of conciseness, same or similar reference characters may be used for same or similar objects in multiple figures. As used herein, the term "coupled" or "coupled to" or "connected" or "connected to" "attached" or "attached to" may indicate establishing either a direct or indirect connection, and is not limited to either unless expressly referenced as such.

Further, embodiments disclosed herein are described with terms designating a rig site in reference to a land rig, but any terms designating rig type should not be deemed to limit the scope of the disclosure. For example, embodiments of the disclosure may be used on an offshore rig and various rig sites, such as land/drilling rig and drilling vessel. It is to be further understood that the various embodiments described herein may be used in various stages of a well, such as rig site preparation, drilling, completion, abandonment etc., and in other environments, such as work-over rigs, fracking installation, well-testing installation, and oil and gas production installation, without departing from the scope of the present disclosure. The embodiments are described merely as examples of useful applications, which are not limited to any specific details of the embodiments herein.

In one or more embodiments, the present disclosure may be directed to systems and methods to autonomously differentiating different types of fluids within a stream fluid. Specifically, embodiments disclosed herein are directed to one or more autonomous inflow control devices in a wellbore to differentiate different types of fluids in a fluid steam of well fluids. These autonomous inflow control devices differentiate the composition of well fluids based on a deflection of the fluid stream flowing within the one or more inflow control devices. For example, the fluid stream flows over a curved portion within the one or more autonomous inflow control devices, and a shape of the curved portion causes the fluid stream to deflect based on fluid properties of the well fluids. The fluid properties may be a density and/or viscosity of the well fluids change based on a volume of water and hydrocarbons in the well fluids. The one or more autonomous inflow control devices further directs the fluid stream into a production tubing based on hydrocarbons therein. Accordingly, the autonomous one or more inflow control devices maintains a predetermined volume of hydrocarbons in fluids produced to a surface from the wellbore. Overall, the one or more autonomous inflow control devices as described herein may reduce product engineering, reduction of assembly time, hardware cost reduction, and weight and envelope reduction. The one or more embodiments of a method of using the autonomous one or more inflow control devices results in achieving well production targets without the need for operators to frequently visit and testing the well and reduction in operational costs associated with conventional production operations.

Turning to FIG. 1, in one or more embodiments, an example of a completion well site 1 is illustrated. Well fluids are produced from a reservoir 11 in a formation 12 by drilling a wellbore 13 into the formation 12, establishing a flow path between the reservoir 11 and the wellbore 13, and conveying the fluids from the reservoir 11 to a surface 14 through the wellbore 13. Additionally, the wellbore 13 may include a vertical section to reach the reservoir 11 and a horizontal section extending into the reservoir 11. A casing 15 may be installed in the wellbore 13. In some embodiments, the casing 15 may be perforated to have perforations 16 into the reservoir 11 to allow a flow of the well fluids to enter the wellbore 13. Typically, a production tubing 17 is disposed in the wellbore 13 to carry the fluids to the surface 14. The production tubing 17 hangs from a wellhead 18 at the surface 14 and forms an annulus 19 between the production tubing 17 and the wellbore 13. The production tubing 17 may extend horizontally into the reservoir 11, thereby forming a flow conduit from the reservoir 11 to surface 14. From the wellhead 18, the fluids are transports, via a production flow line, to a production storage, transport, or facility. In some embodiments, a Christmas tree may be disposed on top of the wellhead 18 for fluid transportation.

As well fluids are produced from the reservoir 11, the well fluids flow into the annulus 19. As the well fluids may contain water, a ratio of hydrocarbons (e.g., oil and/or gas) to water may vary throughout the lifetime of the well. To control an influx of water, one or more autonomous inflow control devices 100 may be provided in the production tubing 17. As the well fluids flow in the annulus 19, the produced well fluids may flow from the annulus 19 and into the production tubing 17 via the one or more autonomous inflow control devices 100.

Figure 2:
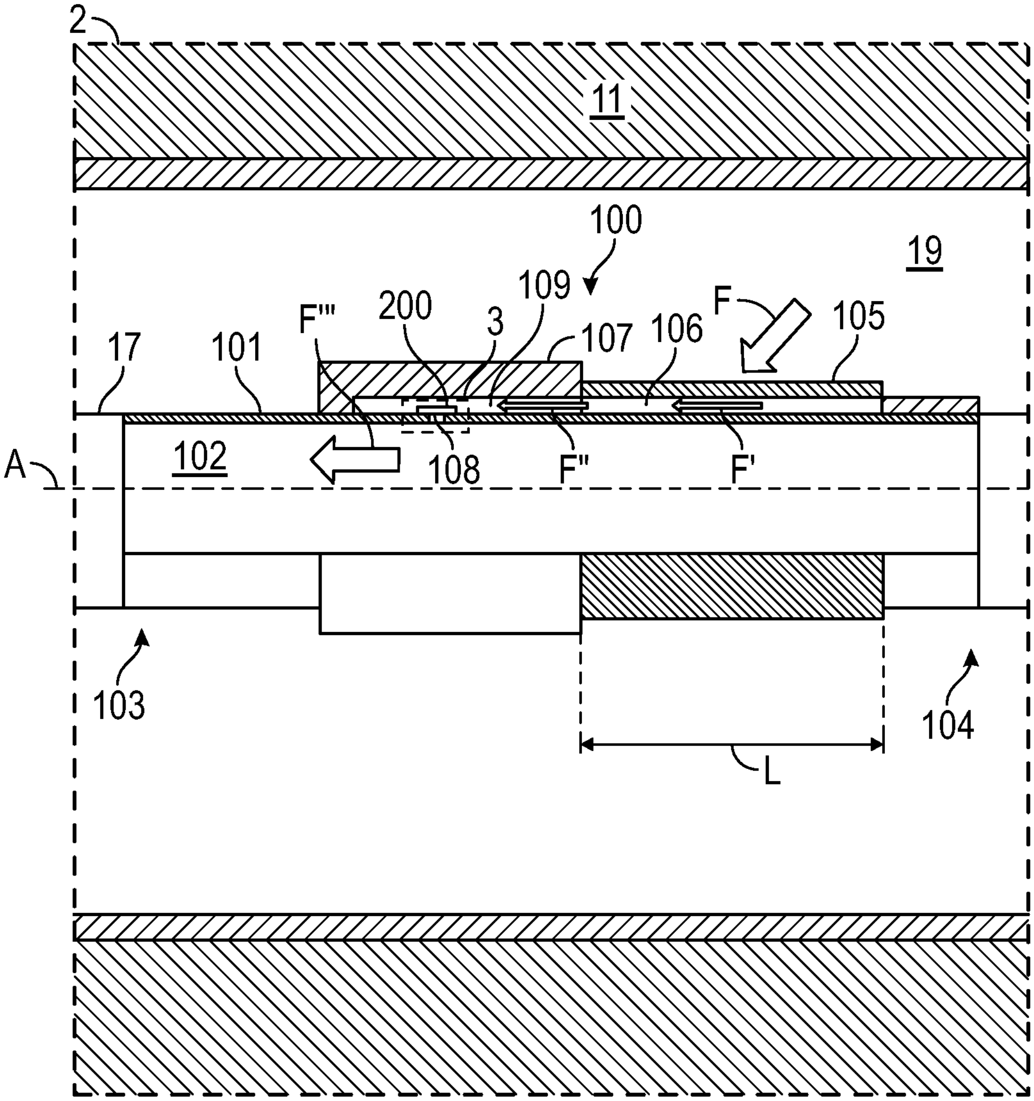
FIG. 2 illustrates a close-up diagram of the dotted box 2 from FIG. 1 according to one or more embodiments of the present disclosure.

As shown in FIG. 2, a close-up view of the dotted box 2 in FIG. 1 illustrates a cross-sectional view of the produced well fluids flowing into the one or more autonomous inflow control tools 100 according to one or more embodiments of the present disclosure. The autonomous inflow control downhole tool 100 includes a body 101 defining a bore 102 extends axially along an axis A from a first end 103 to a second end 104. The first end 103 and the second end 104 may be connection ends to couple the autonomous inflow control downhole tool 100 to a production tubing. For example, the first end 103 may be a female threaded connection and the second end 104 may be a male threaded connection to couple to tubulars of a production tubing.

In one or more embodiments, a screen 105 surrounds a length L of the body 101 to form a space 106 between the screen 105 and the body 101. For example, the screen 105 may be a perforated sleeve to filter debris and solids (such as sand) in well fluids entering (see block arrow F) the autonomous inflow control downhole tool 100 from the annulus 19. The screen 105 acts as an inlet for the autonomous inflow control downhole tool 100 to receive well fluids produced from the reservoir 11. As the screen 105 filters the well fluids, the well fluids flow (see block arrow F') in the space 106.

Adjacent to the screen 105, a housing 107 covers an opening 108 in the body 101 which is fluid communication with the bore 102. Additionally, the housing 107 includes a chamber 109 to receive the well fluids from the space 106. The well fluids flow (see block arrow F") from the space 106 and into the chamber 109. In the chamber 190, the well fluids may enter the bore 102 via the opening 108. Once in the bore 102, the well fluids may proceed to flow (see block arrow F"') out of the autonomous inflow control downhole tool 100 and into the production tubing 17 to go up to the surface (14).

As shown in FIG. 2, an autonomous inflow control device 200 is installed in the opening 108. The autonomous inflow control device 200 regulates a flow of well fluids entering the bore 102 based on a ratio of hydrocarbons (e.g., oil and/or gas) to water. For example, the autonomous inflow control device 200 prevents an influx of water entering the bore 102 such that the well fluids produced to the surface (14) contain a predetermined volume of hydrocarbons. As described below, autonomous inflow control device 200 detects different fluid types in the well fluids and controls a flow based on the detected fluid types.

Figure 3A:
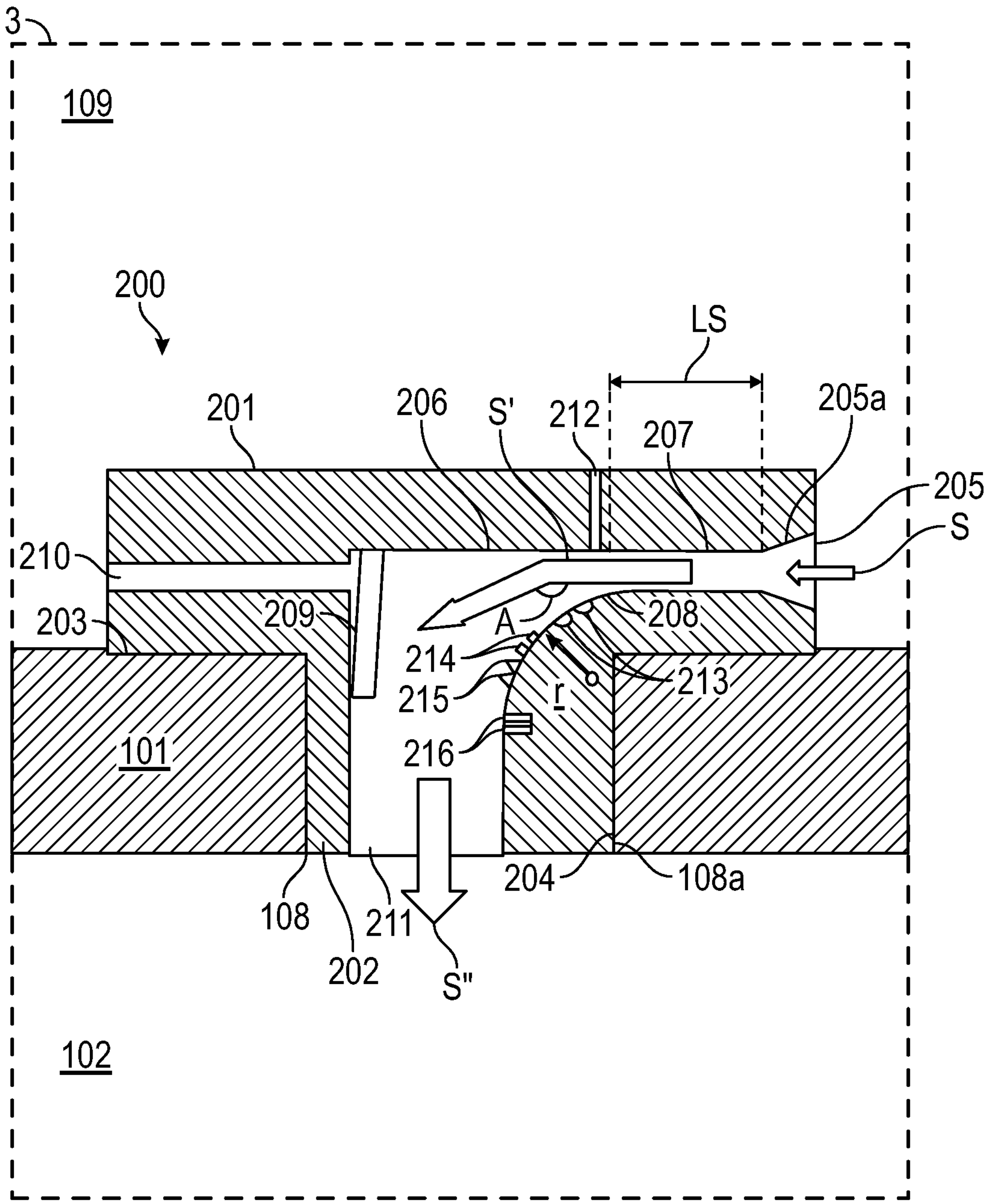
FIGS. 3A-5B illustrate a close-up diagram of the dotted box 3 from FIG. 2 according to one or more embodiments of the present disclosure.
Figure 3B:
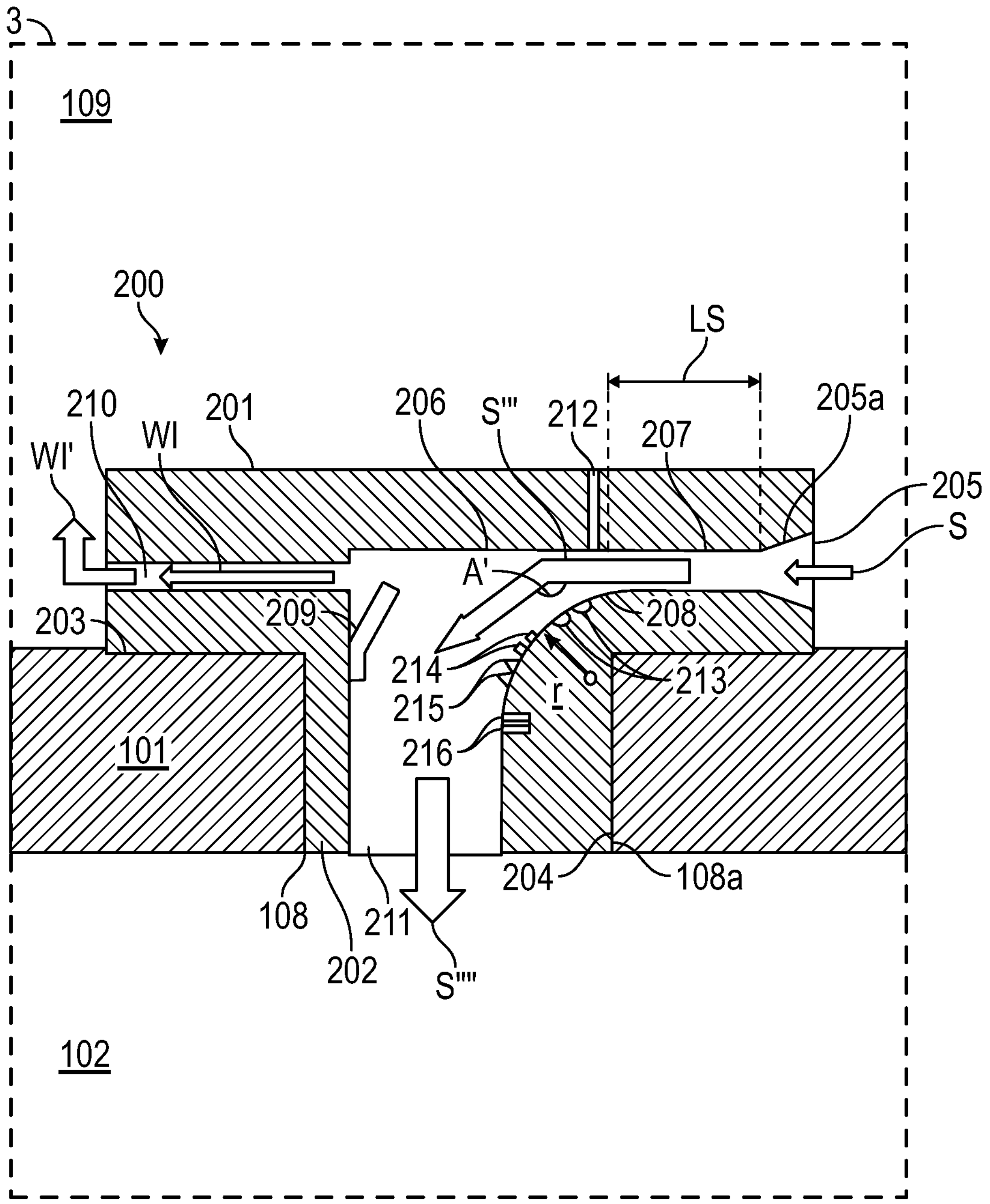

Now referring to FIGS. 3A and 3B, a close-up view of the dotted box 3 in FIG. 2 illustrates a cross-sectional view of the autonomous inflow control device 200 according to one or more embodiments. The autonomous inflow control device 200 includes a body having a top portion 201 and a bottom portion 202. The top portion 201 includes a shoulder 203 to land on the body 101. Additionally, the bottom portion 202 includes a connection surface 204 to couple to a wall 108*a* forming the opening 108. For example, the connection surface 204 may include threads to be threadly coupled to threads on the wall 108*a*.

The autonomous inflow control device 200 includes an inlet to receive well fluids as a fluid stream (see block arrow S) from the chamber 109. The inlet may be an orifice 205 that may be sized to restrict flow and provide a nominally steady fluid velocity to the fluid stream. For example, the orifice 205 may include a tapered surface 205*a* to steady a velocity of the fluid stream. Additionally, the orifice 205 may also be a mixing chamber such that the fluid stream is mixed to an average density and viscosity of the well fluids. For example, the orifice 205 may include a tortuous path whose geometry mixes the fluid stream to the average density and viscosity of the well fluids.

From the orifice 205, the fluid stream is directed into a cavity 206 defined by the body of the autonomous inflow control device 200. Initially, the cavity 206 includes a straight-line profile 207 over a length LS from the orifice 205. For example, the length LS may be based on a length required to reduce a turbulence in the fluid stream to form a steady stream. It is further envisioned that geometric features, such as strakes or other similar geometric features, may also be added the straight-line profile 207 to reduce turbulence to form a steady stream.

In the cavity 206, the fluid stream flows from the straight-line profile 207 and is directed over a deflection surface 208. A profile of the deflection surface 208 causes the fluid stream to deflect (see block arrow S'). The profile of the deflection surface 208 may have a predetermined geometry to deflect the fluid stream at an angle A determined from a predetermined fluid property range of the fluid stream. For example, the profile of the deflection surface 208 may be a convex curve with a radius r designed to deflect (see block arrow S') the fluid stream at the angle A. The deflection angle A of the fluid stream measurably changes when a density and/or viscosity of this fluid stream changes. In some embodiments, the radius r or curvature of the deflection surface 208 may be chosen to maintain laminar or consistent fluid flow over a portion of the deflection surface 208. For example, a nozzle divergence angle of under 20 degrees is typically used in a venturi nozzle to ensure the fluid stream does not break away from the wall. Similarly, a NACA duct and de Laval nozzle have carefully controlled wall surface geometries to prevent cavitation, turbulence or eddies, and ensure smooth flow. Additionally, a curvature or radius may then be tightened at a particular distance along the deflection surface 208 to set the approximate location where the fluid stream breaks free from the deflection surface 208 and travels to an actuation device (209). It is further envisioned that an effect of gravity on the deflection angle A of the fluid stream may be negligible as the fluid stream has sufficient velocity and a distance travelled from the deflection surface 208 to an actuation device is relatively short. Additionally, this relatively short distance makes the deflection angle A of the fluid stream insensitive to deployment inclination and orientation of the autonomous inflow control device 200.

From the deflection surface 208, the fluid stream impinges on the actuation device, such as a valve 209, within the cavity 206. For example, based on the deflection angle A, the fluid stream provides a pressure on the valve 209 to close or open the valve 209. As shown in FIG. 3A, the fluid stream deflects at the angle A matching a predetermined angle based on the predetermined fluid property range of the fluid stream. This angle A correlates with the fluid stream deflecting and providing a predetermined pressure to close the valve 209 and cover an influx outlet 210. In some embodiments, the valve 209 may be a spring-loaded valve such that the predetermined pressure matches a required pressure to overcome a spring load and compress a spring of the valve 209 thereby closing the valve 209. Alternatively, the valve 209 may be a reed valve such that the predetermined pressure matches a required pressure to move a pedal or retainer to cover influx outlet 210 thereby closing the valve 209. One skilled in the art will appreciate how the valve 209 may operate in an analog method, adjusting a bulk influx of well fluid in proportion to the fluid stream deflection angle A. This gives a proportioning effect, throttling flow in proportion to water fraction in the cavity 206. Alternatively, the valve 209 might operate in a binary or digital way, flip-flopping between the fully open and fully closed position, depending on water content and after a predetermined threshold is reached. It is further envisioned that the valve 209 may be replaced with a wheel or turbine to rotate based on the fluid stream deflection angle A to open or close the influx outlet 210.

Still referring to FIG. 3A, the deflection surface 208 may include various flow devices to promote fluid flow over the deflection surface 208. For example, the deflection surface 208 may be provided with one or more dimples 213, or one or more ribs 214, or one or more corrugations 215, or a combination thereof. As the fluid stream flow over the deflection surface 208, the one or more dimples 213, or one or more ribs 214, or one or more corrugations 215 encourage turbulence adjacent to the deflection surface 208 and encourage the fluid stream to follow the curved profile of the deflection surface 208 thereby reducing turbulence in the fluid stream after the deflection surface 208. It is further envisioned that one or more holes or ports 216 may be provided in the deflection surface 208 to encourage the fluid stream to follow the curved profile of the deflection surface 208.

In one or more embodiments, the fluid stream may be metered or throttled to reduce water influx before the deflection surface 208. For example, a bleed hole 212 may be provided in the top portion 201 to bleed a water influx out of the fluid stream.

As shown in FIG. 3A, when the fluid stream deflects the angle A and has the predetermined pressure to close valve 209, the fluid stream has the predetermined fluid property range, and the fluid stream exits (see block arrow S'') the cavity 206 via an outlet 211. The outlet 211 is in fluid communication with the bore 102 so that the fluid stream flows into the bore 102 from the cavity 206. From the bore 102, the fluid stream may travel up a production tubing.

Now referring to FIG. 3B, an example of the fluid stream having a water influx is illustrated. For example, when the fluid property range of the fluid stream does not match the predetermined fluid property range, the fluid stream flowing (see block arrow S') over the deflection surface 208 deflects at a second angle A' different from the angle A shown in FIG. 3A. The second angle A' may be smaller than the angle A thereby signaling a change in a density and/or viscosity of this fluid stream.

As the fluid stream deflect at the second angle A', the fluid stream provides a second pressure on the valve 209. However, the second pressure does not equal the predetermined pressure to close the valve 209 thereby opening the valve 209 as shown in FIG. 3B. For example, the fluid stream deflecting at the second angle A' no longer exerts enough force on the valve 209 to close it against the influx outlet 210. With the valve 209 open, the influx outlet 210 is no longer covered and in fluid communication with the cavity 206. In the open position, a portion of the fluid stream flows (see block arrow WI) over the valve 209 and into the influx outlet 210. The portion of the fluid stream flows may be majority water in composition. From the influx outlet 210, the portion of the fluid stream flows (see block arrow WI') back into the chamber 109 of the autonomous inflow control devices (100).

In some embodiments, an opening and closing of the valve 209 causes a flow or pressure change in the influx outlet 210. This can actuate any suitable mechanism or system to then close primary ports in the tubing. The inflow control device 200 acts as a continuously operating pilot valve, sensing fluid properties. For example, when the inflow control device 200 senses water, the valve 209 closes the primary (much larger) ports (i.e., the outlet 211) to prevent water inflow from the well. When the inflow control device 200 senses oil, the valves 209 opens the primary ports (i.e., the outlet 211) and oil can flow into the wellbore to surface. The valve 209 may be a lever, piston, diaphragm or any similar device to magnify the relatively modest force/pressure change into a suitably large force to open or close ports (e.g., the outlet 211 and influx outlet 210).

In one or more embodiments, as the portion of the fluid stream flows (see block arrow WI') back into the chamber 109, a remain portion of the fluid stream exits (see block arrow S'''') the cavity 206 via the outlet 211 to enter the bore 102. From the bore 102, the remain portion of the fluid stream may travel up a production tubing. In some embodiments, the outlet 211 may continuously flow fluids into the bore 102. For example, some small quantity of fluid will enter the wellbore via the outlet 211. However, the small quantity of fluid may be modest/negligible compared to the flow volume when primary ports are open (e.g., the outlet 211 and influx outlet 210).

In some embodiments, hysteresis may be introduced to the autonomous inflow control device 200, to prevent the valve 209 from fluttering. For example, a predetermined threshold to close the valve 209 may be a 70% water-cut in the well fluids. If the water-cut increases to 71% or more, the deflection of the fluid stream may match the first angle A to move the valve 209 to the closed position, as shown in FIG. 3A. However, if the water-cut drops to 69% or less, the deflection of the fluid stream may match the second angle A' to move the valve 209 to the open position, as shown in FIG. 3B. one skilled in the art will apprentice how introducing hysteresis may widen this range and allows for more stability in the autonomous inflow control device 200.

In one or more embodiments, the autonomous inflow control device 200 may be adjusted while in situ without needing to recover the autonomous inflow control device 200 to surface. For example, a coiled-tubing operated a shifting-tool might be deployed into the wellbore (13) to adjust the autonomous inflow control device 200. The shifting-tool may enter the cavity 206 via the outlet 211. Once in the cavity 206, the shifting-tool may adjust the position of the valve 209 to set a new preset position thereby adjusting threshold ranges and water sensitivity. It is further envisioned that the shifting-tool may be used to adjust the deflection surface 208. For example, the deflection surface 208 may be movable such as being inflated, or have a linkage to allow a position or shape of the deflection surface 208 to be adjusted. The shifting-tool may move the deflection surface 208 or change other aspects of the inflow control device 200 (e.g., change an inlet shape, the spring force on the valve 209, a diameter of the outlet 210, etc.)

Figure 4A:
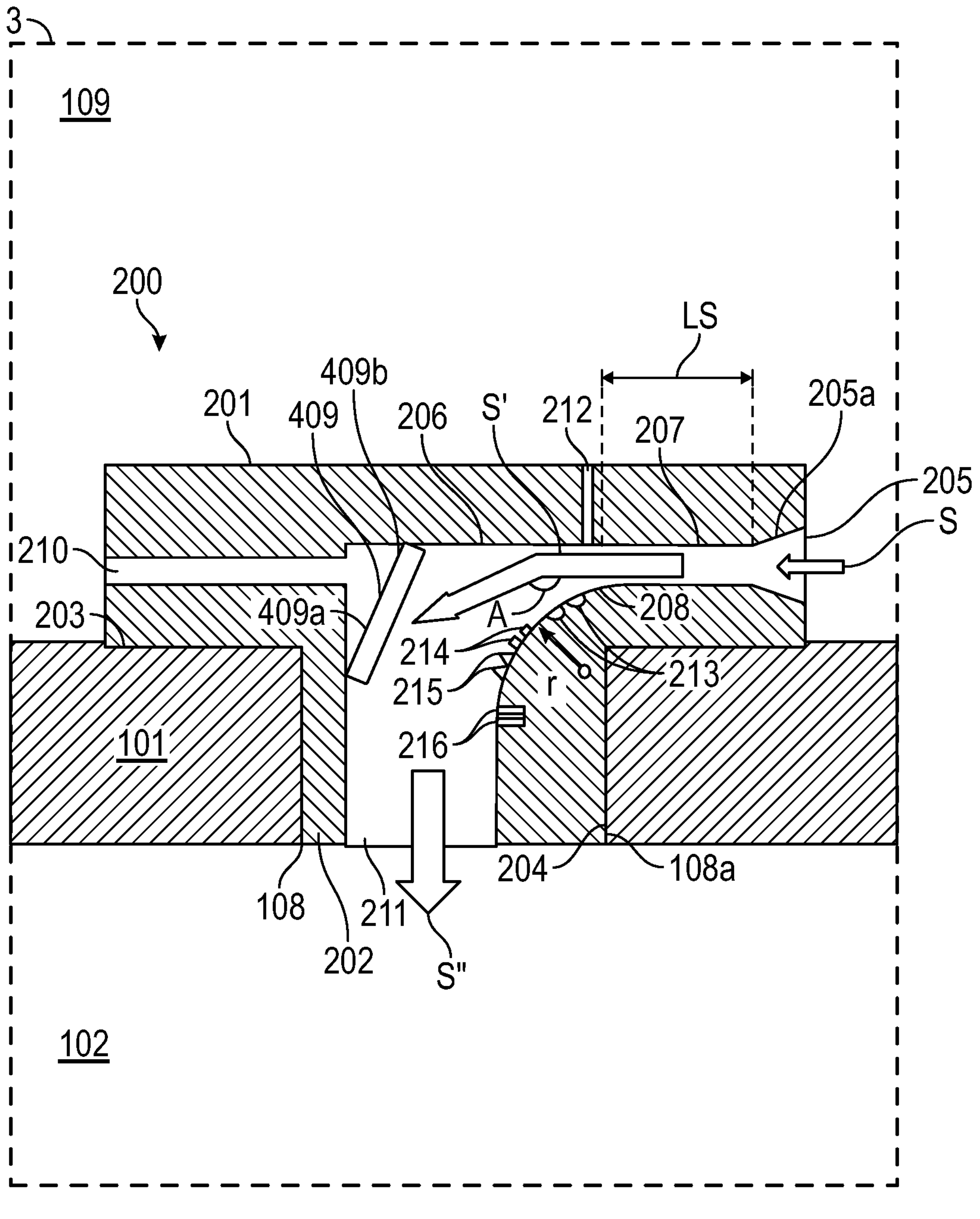
Figure 4B:
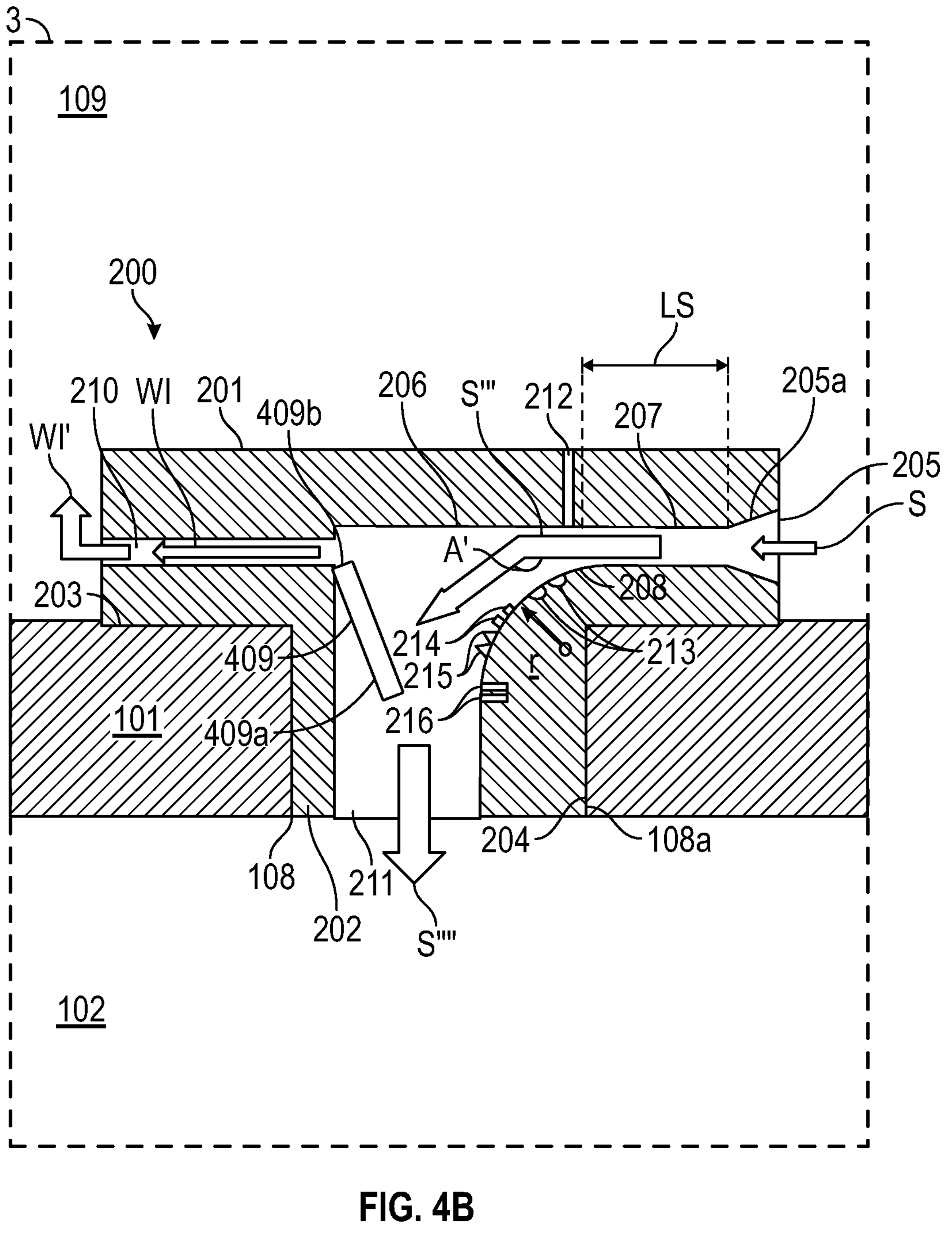

Referring now to FIGS. 4A and 4B, another embodiment of the autonomous inflow control device 200 according to embodiments herein is illustrated, where like numerals represent like parts. The embodiment of FIGS. 4A and 4B is similar to that of the embodiment of FIGS. 3A and 3B. However, in place of the valve (see 209 in FIG. 2), the actuation device is a lever, linkage, or switch 409 to be actuated based on the fluid stream deflection angle A to open or close the influx outlet 210. For example, the lever, linkage, or switch 409 extends from a first end 409_a_ to a second end 409_b_ to cover (closed position) or expose (open position) the influx outlet 210.

As shown in FIG. 4A, the fluid stream deflects at the angle A matching the predetermined angle based on the predetermined fluid property range of the fluid stream. This angle A correlates with the fluid stream deflecting and providing a predetermined pressure to the first end 409_a_ of the lever, linkage, or switch 409 to cover the influx outlet 210. However, in the FIG. 4B, when the fluid property range of the fluid stream does not match the predetermined fluid property range, the fluid stream flowing (see block arrow S') over the deflection surface 208 deflects at the second angle A' to apply a pressure to the second end 409_b_ of the lever, linkage, or switch 409. The pressure on the second end 409_b_, the lever, linkage, or switch 409 rotates to move to the open position and exposes the influx outlet 210.

Figure 5A:
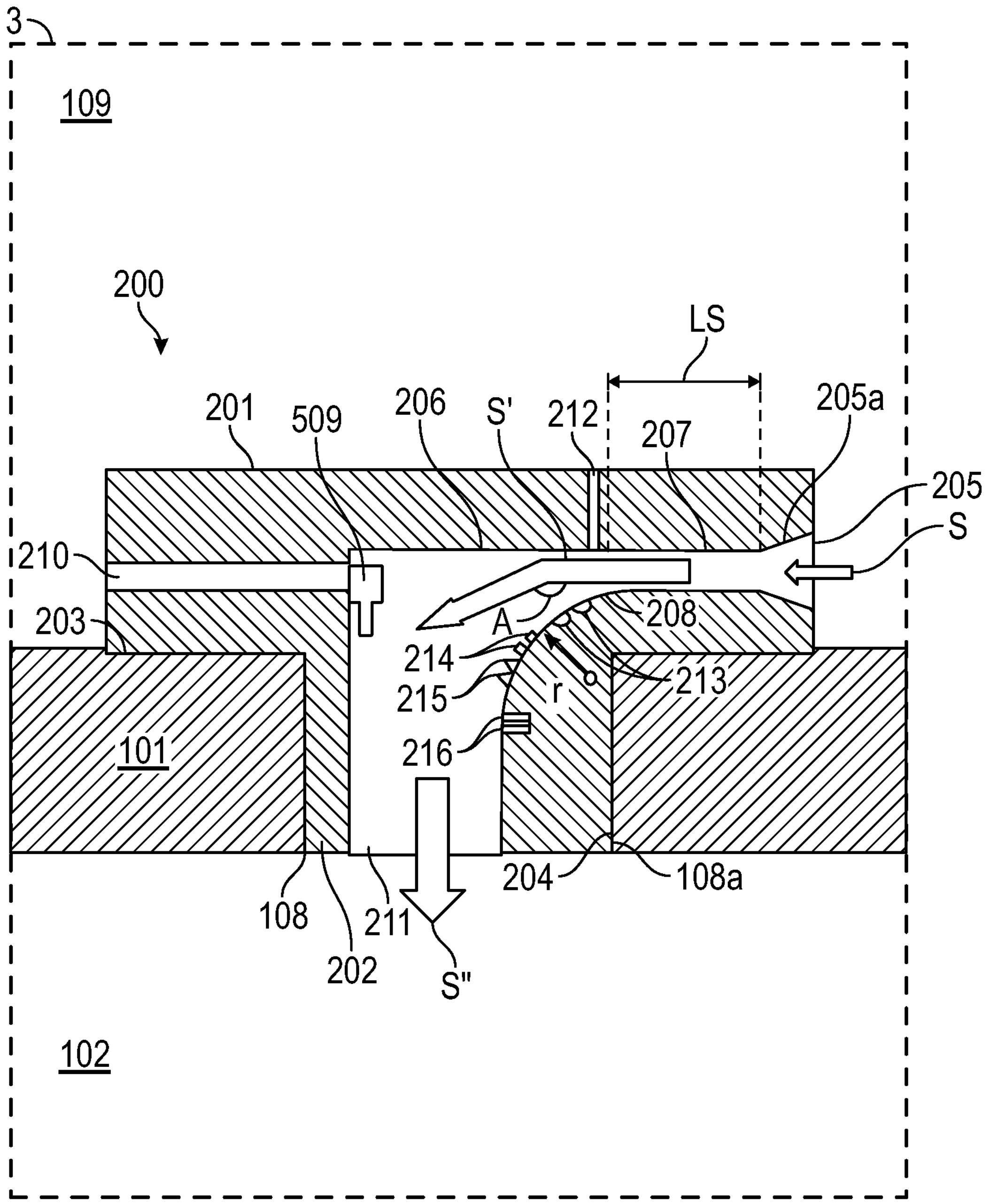
Figure 5B:
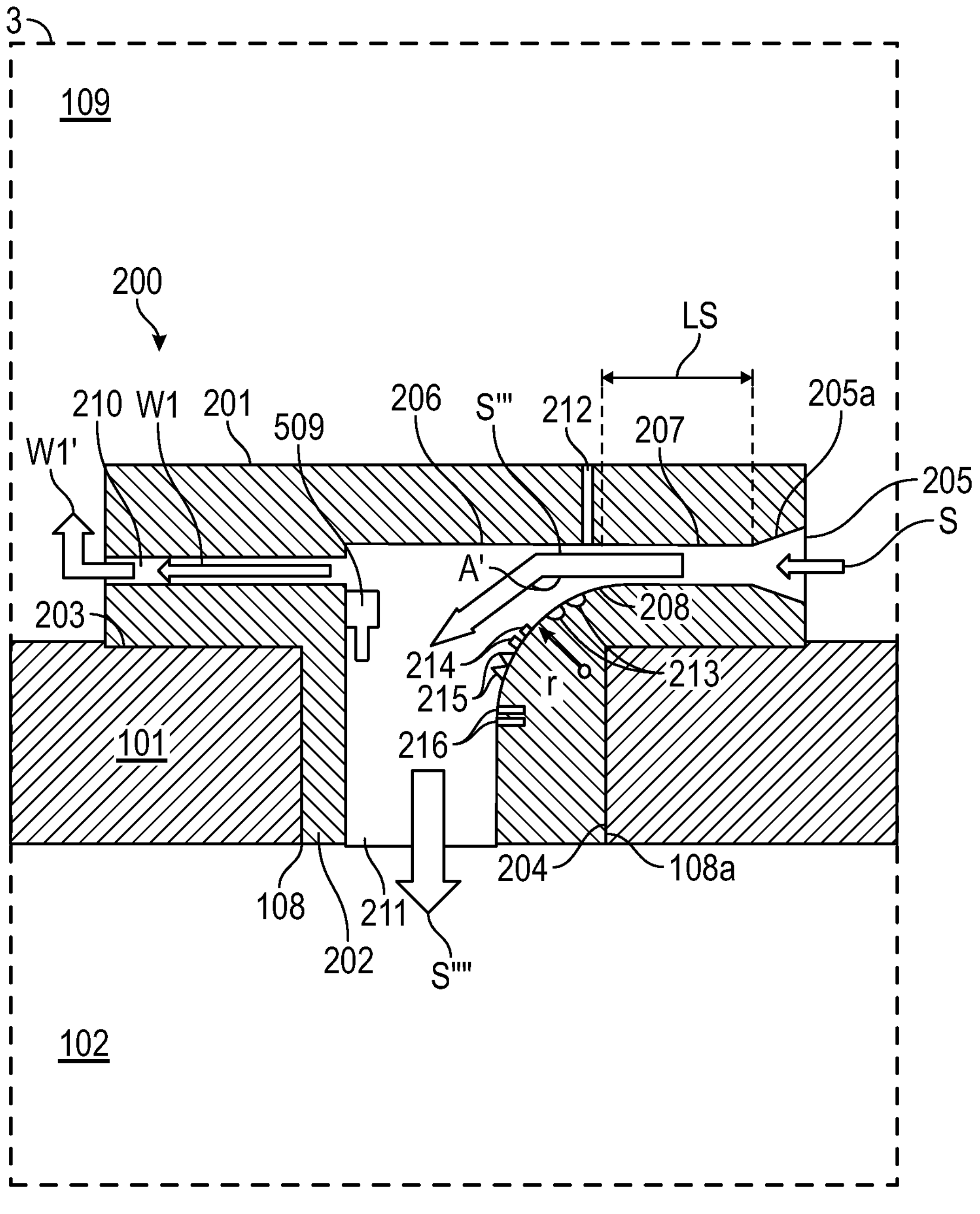

Referring now to FIGS. 5A and 5B, another embodiment of the autonomous inflow control device 200 according to embodiments herein is illustrated, where like numerals represent like parts. The embodiment of FIGS. 5A and 5B is similar to that of the embodiment of FIGS. 3A and 3B. However, in place of the valve (see 209 in FIG. 2), the actuation device is a piston or plunger 509 which axially move based on the fluid stream deflection angle A to cover (closed position) or expose (open position) the influx outlet 210.

As shown in FIG. 5A, the fluid stream deflects at the angle A matching the predetermined angle based on the predetermined fluid property range of the fluid stream. This angle A correlates with the fluid stream deflecting and providing a predetermined pressure to the piston or plunger 509 to axially move upward and cover the influx outlet 210. However, in the FIG. 5B, when the fluid property range of the fluid stream does not match the predetermined fluid property range, the fluid stream flowing (see block arrow S') over the deflection surface 208 deflects at the second angle A' to apply less pressure to the piston or plunger 509. With less pressure than the predetermined pressure on the piston or plunger 509, the piston or plunger 509 axially moves downward to the open position and exposes the influx outlet 210.

Figure 6:
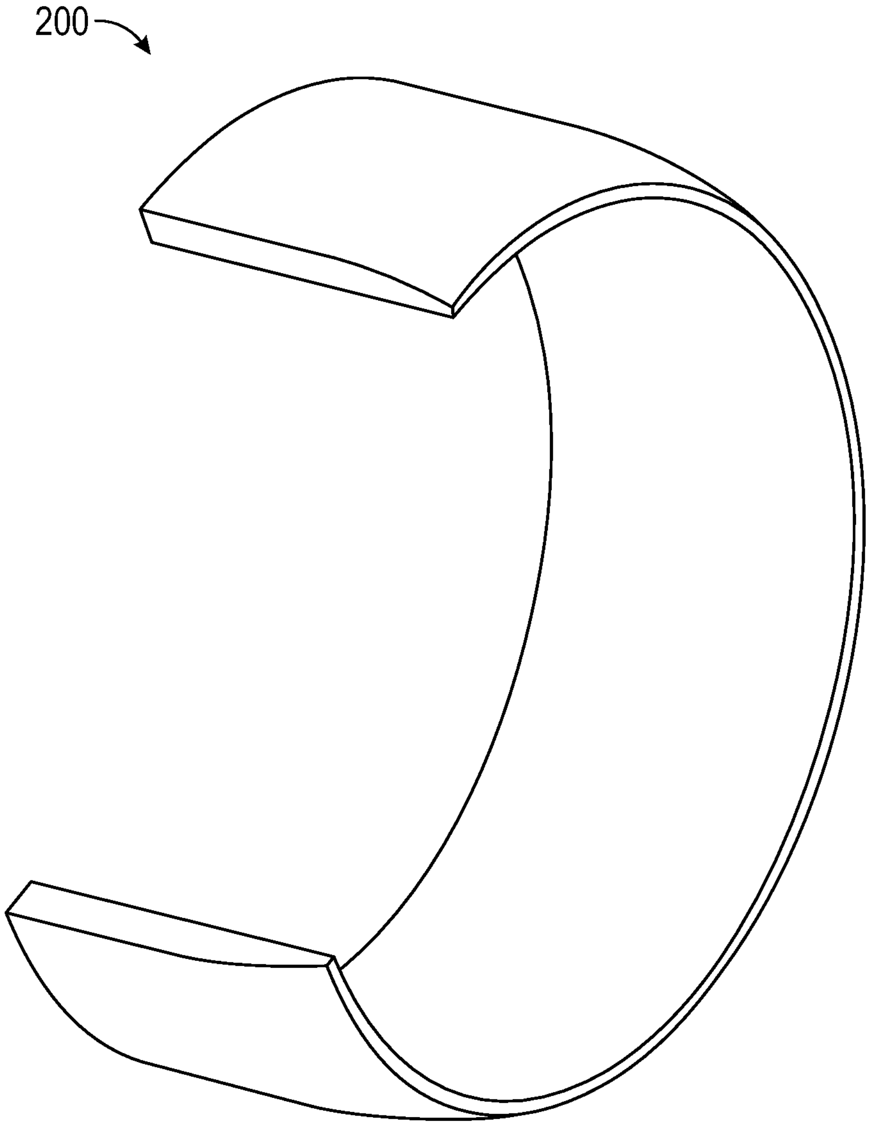
FIG. 6 illustrate a profile of an autonomous inflow control device according to one or more embodiments of the present disclosure.

Now referring to FIG. 6, in one or more embodiments, the autonomous inflow control device 200 may have an arc or ring profile. By having the arc or ring profile, the autonomous inflow control device 200 may be easily packaged within the chamber (109) of the autonomous inflow control devices (100). Additionally, the arc or ring profile increases the insensitive of flow within the autonomous inflow control device 200 based on an orientation when deployed downhole. Further, the arc or ring profile advantageously also packages the cavity (206) in a periphery of the chamber (109) and leaves the bore (102) of the autonomous inflow control devices (100) unobstructed. [

Figure 7:
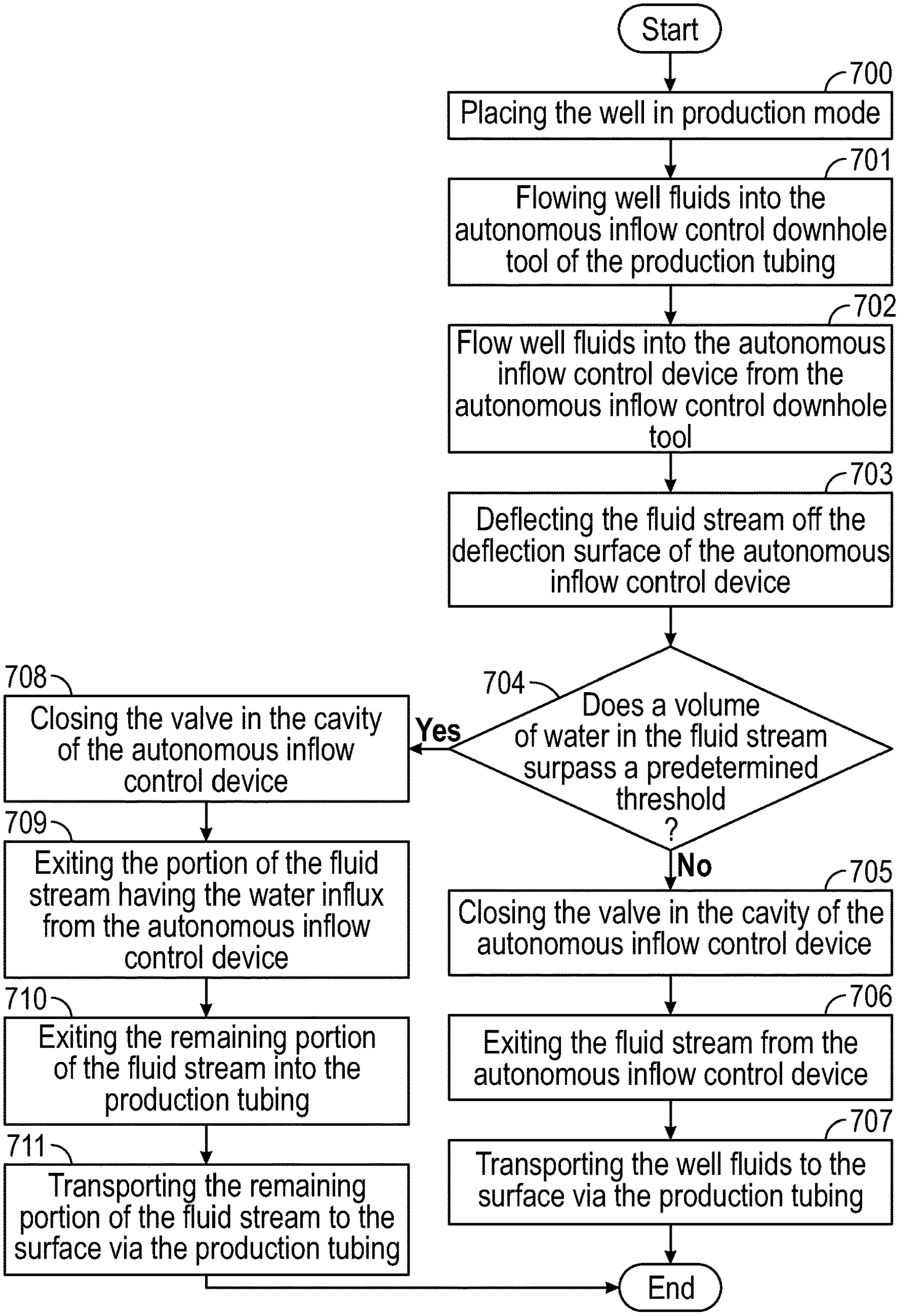
FIG. 7 illustrates a flowchart according to one or more embodiments of the present disclosure.

FIG. 7 is a flowchart showing a method of a fluid production using the autonomous inflow control device 200 of FIGS. 2-6. One or more steps in FIG. 7 may be performed by one or more components as described in FIGS. 2-6. For example, a non-transitory computer readable medium may store instructions on a memory coupled to a processor such that the instructions include functionality for operating the autonomous inflow control downhole tool 100. While the various steps in FIG. 7 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 700, the well is placed in production mode to produce fluids from the reservoir. For example, fluids, such as hydrocarbons, flow out of the reservoir and enter the wellbore via perforations. In the wellbore, the well fluids flow in an annulus between the wellbore and the production tubing.

In Step 701, from the annulus, the well fluids flow into the autonomous inflow control device of the production tubing. For example, the well fluids flow through the screen of the autonomous inflow control downhole tool. The screen filters the well fluids from debris and solids. From the screen, the well fluids flow in the space between the screen and the body of the autonomous inflow control downhole tool. In the space, the well fluids flow into a chamber of a housing on the autonomous inflow control downhole tool.

In Step 702, from the chamber, the well fluids flow through the autonomous inflow control device in fluid communication as fluid stream. For example, an orifice of the autonomous inflow control device receives the fluid stream from the chamber. Additionally, the orifice may mix the fluid stream to an average density and viscosity of the well fluids. For example, the fluid stream may be rotated in the orifice to the average density and viscosity of the well fluids. From the orifice, the fluid stream is directed over the deflection surface in the cavity of the autonomous inflow control device.

In Step 703, in the cavity, the fluid stream is deflected off the deflection surface in the autonomous inflow control device. For example, a profile of the deflection surface causes the fluid stream to deflect an angle. The deflection angle is based on the curved profiled of the deflection surface and a predetermined fluid property range of the fluid stream.

In Step 704, a volume of water in the fluid stream determines the deflection angle off the deflection surface. If the volume of water does not surpass a predetermined threshold, the deflection angle is at the first angle to flow the fluid stream at a required velocity and pressure to close the valve in the cavity, as shown in Step 705. For example, the fluid stream provides a force great enough to close the valve thereby indicating the fluid stream is within the predetermined fluid property range.

In Step 706, with the valve closed, the fluid stream exits the autonomous inflow control device via an outlet in fluid communication with the cavity. From the outlet, the fluid stream enters the bore of the autonomous inflow control downhole tool.

In Step 707, the well fluids in the bore are transported to a surface via the production tubing. From the bore of the autonomous inflow control downhole tool, the well fluids flow into the production tubing and are pumped up the production tubing to the surface. From the surface, the well fluids may be transported to a production storage, transport, or facility.

Referring back to Step 704, If the volume of water does surpass a predetermined threshold, the deflection angle is at the second angle to flow the fluid stream at a velocity and pressure to open the valve in the cavity, as shown in Step 708. For example, the fluid stream does not provide enough force to close the valve thereby opening valve. The open valve indicates that there is water influx, and the fluid stream is not within the predetermined fluid property range.

In Step 709, the portion of the fluid stream with the water influx is exited out of the autonomous inflow control device. For example, as the valve is opened, the influx outlet is exposed and in fluid communication with the cavity thereby allowing an exit for the portion of the fluid stream with the water influx. The portion of the fluid stream with the water influx flows through the influx outlet and back to the chamber of the autonomous inflow control downhole tool.

In Step 710, the remaining portion of the fluid stream is exited out of the autonomous inflow control device and into the production tubing. For example, the remaining portion of the fluid stream exits the autonomous inflow control device via an outlet in fluid communication with the cavity. From the outlet, the fluid stream enters the bore of the autonomous inflow control downhole tool and into the production tubing.

In Step 711, the remaining portion of the fluid stream are transported to the surface via the production tubing. From the bore of the autonomous inflow control downhole tool, the remaining portion of the fluid stream flow into the production tubing and are pumped up the production tubing to the surface. From the surface, the well fluids may be transported to a production storage, transport, or facility.

In one or more embodiments, the flowchart of FIG. 7 allows for the autonomous inflow control device to differentiate between fluids in produced well fluids to avoid a water influx in the produced fluids and maintain a sufficient volume of hydrocarbons. Additionally, the flowchart of FIG. 7 allows for the autonomous inflow control device to be considered as a sensor for fluidic logic (i.e., the output changes with fluid type). Further, the autonomous inflow control device provides a mechanical method to determine the fluid properties and composition of produced well fluids based on a deflection angle.

In addition to the benefits described above, the autonomous inflow control device may improve an overall efficiency and performance at the well while reducing cost, well site safety, reduced risk of non-productive time (NPT), and many other advantages. Further, the autonomous inflow control device may provide further advantages such as not requiring external power, operating in any orientation and inclination, reducing the need for frequent well testing, and reducing or eliminating human interaction with well equipment to reduce human errors. It is noted that the autonomous inflow control device may be used for onshore and offshore oil and gas operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An autonomous inflow control device, comprising:

a body defining a cavity;

an inlet in fluid communication with the cavity, wherein the inlet receives well fluids;

a deflection surface within the cavity, wherein the well fluids deflect off the deflection surface at an angle based on a predetermined fluid property range of the well fluids;

an influx outlet in fluid communication with the cavity;

an actuation device disposed in the cavity, wherein based on the angle the well fluids deflect off the deflection surface, the actuation device moves between an open position and a closed position, wherein when the actuation device is in the closed position, the actuation device covers the influx outlet, wherein when the actuation device is in the open position, the actuation device exposes the influx outlet to direct a volume of water from the well fluids out of the cavity; and an outlet in fluid communication with the cavity, wherein the outlet directs the well fluids out of the cavity.

2. The autonomous inflow control device of claim 1, wherein the inlet is an orifice to restrict flow and provide a nominally steady fluid velocity to the well fluids entering the cavity.

3. The autonomous inflow control device of claim 1, wherein the deflection surface has a curved profile.

4. The autonomous inflow control device of claim 1, wherein the deflection surface further comprises one or more dimples, or one or more ribs, one or more corrugations, one or more ports or a combination thereof.

5. The autonomous inflow control device of claim 1, further comprising a bleed hole configured to meter or throttle the well fluids before the deflection surface.

6. The autonomous inflow control device of claim 1, wherein the actuation device is a valve, a lever, a linkage, a switch, a piston, or a plunger configured to move between the open position and the closed position.

7. The autonomous inflow control device of claim 1, wherein the deflection surface comprises a deflection angle of less than 20 degrees along at least a portion of the deflection surface in order to maintain a laminar flow along at least a portion of the deflection surface.

8. A system, comprising:

a tubing string disposed within a wellbore to be in fluid communication with a reservoir;

one or more autonomous inflow control tools providing the tubing string to receive well fluids produced from the reservoir, wherein the one or more autonomous inflow control tools comprises a chamber in fluid communion with the tubing string;

an autonomous inflow control device disposed in the chamber of the one or more autonomous inflow control tools, wherein the autonomous inflow control device is configured to regulate a flow of the well fluids entering the tubing string based on a ratio of hydrocarbons to water, the autonomous inflow control device comprising:

a body defining a cavity;

an inlet in fluid communication with the cavity to receive the well fluid from the chamber;

a deflection surface within the cavity, wherein the well fluids deflect off the deflection surface at an angle based on the ratio of hydrocarbons to water;

an actuation device disposed in the cavity, wherein based on the angle the well fluids deflect off the deflection surface, the actuation device moves between an open position and a closed position, wherein when the actuation device is in the open position, the actuation device exposes an influx outlet to direct a volume of water from the well fluids out of the cavity and back into the chamber, and wherein when the actuation device is in the closed position, the actuation device covers the influx outlet; and an outlet in fluid communication with the cavity, wherein the outlet directs the well fluids into a bore of the one or more autonomous inflow control tools.

9. The system of claim 8, wherein the one or more autonomous inflow control tools comprises a screen to filter the received well fluids.

10. The system of claim 8, wherein a top portion of the autonomous inflow control device lands on a body of the one or more autonomous inflow control tools in the chamber.

11. The system of claim 10, wherein a bottom portion of the autonomous inflow control device is coupled to an opening in the body.

* * * * *